United States Patent
Benrashid et al.

(10) Patent No.: US 8,163,358 B2
(45) Date of Patent: Apr. 24, 2012

(54) SURFACE MODIFICATION OF CONTACT LENSES

(75) Inventors: Ramazan Benrashid, Concord, NC (US); Ivan Sabath, Santee, CA (US); Jenny Xuan Huynh, Fontana, CA (US)

(73) Assignee: Synergeyes, Inc., Carlsbad, CA (US)

( * ) Notice: Subject to any disclaimer, the term of this patent is extended or adjusted under 35 U.S.C. 154(b) by 284 days.

(21) Appl. No.: 12/708,455

(22) Filed: Feb. 18, 2010

(65) Prior Publication Data
US 2010/0208196 A1    Aug. 19, 2010

Related U.S. Application Data

(60) Provisional application No. 61/153,588, filed on Feb. 18, 2009.

(51) Int. Cl.
*C23C 14/02*     (2006.01)
*G02C 7/04*      (2006.01)
*H05H 1/24*      (2006.01)
*B05D 3/06*      (2006.01)

(52) U.S. Cl. ........ 427/536; 427/532; 427/533; 427/534; 427/539; 427/569; 351/160 H; 351/161

(58) Field of Classification Search .................. None
See application file for complete search history.

(56) References Cited

U.S. PATENT DOCUMENTS

| | | | |
|---|---|---|---|
| 3,782,045 A | 1/1974 | Kanda | |
| 3,874,124 A | 4/1975 | Morgan et al. | |
| 3,925,178 A | 12/1975 | Gesser et al. | |
| 3,955,726 A | 5/1976 | Reitzel | |
| 4,055,378 A | 10/1977 | Feneberg et al. | |
| 4,096,315 A * | 6/1978 | Kubacki | 428/412 |
| 4,137,365 A * | 1/1979 | Fletcher et al. | 428/412 |
| 4,163,609 A | 8/1979 | Neefe | |
| 4,169,119 A | 9/1979 | Covington | |
| 4,280,759 A | 7/1981 | Neefe | |

(Continued)

FOREIGN PATENT DOCUMENTS

DE     4113292     10/1992

(Continued)

OTHER PUBLICATIONS

Sodhi, R. N. S., et al., Application of electron spectroscopy and surface modification techniques in the development of anti-microbial coatings for medical devices, Journal of Electron Spectroscopy and Related Phenomena, Dec. 2001, pp. 249-264, vol. 121-1-3, Elsevier, Netherlands.

(Continued)

*Primary Examiner* — Timothy Meeks
*Assistant Examiner* — Joseph Miller, Jr.
(74) *Attorney, Agent, or Firm* — Knobbe Martens Olson & Bear, LLP (57) ABSTRACT

A method of increasing the hydrophilicity of a polymer surface, such as a contact lens surface, includes exposing the polymer substrate to a first plasma under conditions selected to generate free radicals on the surface of the polymer substrate. The method also includes reacting an organic compound with the free radicals on the surface of the polymer substrate to thereby form an organic coating. The method further includes exposing the organic coating to a second plasma under conditions selected to oxidize the organic coating to thereby form a hydrophilic layer at the substrate surface. The hydrophilic layer can have a contact angle with respect to water that is less than about 50°.

27 Claims, 3 Drawing Sheets

U.S. PATENT DOCUMENTS

| | | | |
|---|---|---|---|
| 4,287,175 | A | 9/1981 | Katz |
| 4,306,042 | A | 12/1981 | Neefe |
| 4,312,725 | A | 1/1982 | Loshaek et al. |
| 4,321,261 | A | 3/1982 | Ellis et al. |
| 4,357,173 | A | 11/1982 | Rosenthal et al. |
| 4,414,375 | A | 11/1983 | Neefe |
| 4,436,730 | A | 3/1984 | Ellis et al. |
| 4,487,905 | A | 12/1984 | Mitchell |
| 4,495,361 | A | 1/1985 | Friends et al. |
| 4,508,884 | A | 4/1985 | Wittmann et al. |
| 4,550,001 | A | 10/1985 | Suminoe et al. |
| 4,626,292 | A | 12/1986 | Sherman |
| 4,652,622 | A | 3/1987 | Friends et al. |
| 4,743,106 | A | 5/1988 | Novicky |
| 4,747,683 | A | 5/1988 | Doane |
| 4,796,991 | A | 1/1989 | Gordon et al. |
| 4,861,850 | A | 8/1989 | Novicky |
| 4,874,234 | A | 10/1989 | Wichterle |
| 4,911,933 | A | 3/1990 | Gilbard |
| 4,940,751 | A | 7/1990 | Frances et al. |
| 4,948,855 | A | 8/1990 | Novicky |
| 4,951,811 | A | 8/1990 | Lines |
| 4,968,532 | A | 11/1990 | Janssen et al. |
| 5,093,447 | A | 3/1992 | Novicky |
| 5,133,708 | A | 7/1992 | Smith |
| 5,206,298 | A | 4/1993 | Kawaguchi |
| 5,227,039 | A | 7/1993 | Pankow |
| 5,274,008 | A | 12/1993 | Lai |
| 5,498,407 | A | 3/1996 | Atlas |
| 5,529,678 | A | 6/1996 | Pankow |
| 5,529,727 | A | 6/1996 | LaBombard et al. |
| 5,532,224 | A | 7/1996 | Desai et al. |
| 5,708,050 | A | 1/1998 | Nakada et al. |
| 5,712,327 | A | 1/1998 | Chang et al. |
| 5,744,271 | A * | 4/1998 | Aizawa et al. ............ 430/59.6 |
| 5,849,222 | A | 12/1998 | Jen et al. |
| 5,874,127 | A | 2/1999 | Winterton et al. |
| 5,888,656 | A | 3/1999 | Suzuki et al. |
| 5,910,518 | A | 6/1999 | Nakada et al. |
| 6,075,066 | A | 6/2000 | Matsuda et al. |
| 6,099,852 | A | 8/2000 | Jen |
| 6,193,369 | B1 | 2/2001 | Valint, Jr. et al. |
| 6,213,604 | B1 | 4/2001 | Valint, Jr. et al. |
| 6,348,507 | B1 | 2/2002 | Heiler et al. |
| 6,440,571 | B1 | 8/2002 | Valint, Jr. et al. |
| 6,468,667 | B1 | 10/2002 | Chabrecek et al. |
| 6,550,915 | B1 | 4/2003 | Grobe, III |
| 6,599,559 | B1 | 7/2003 | McGee et al. |
| 6,630,243 | B2 | 10/2003 | Valint, Jr. et al. |
| 6,638,563 | B2 | 10/2003 | McGee et al. |
| 6,689,480 | B2 | 2/2004 | Shimoyama et al. |
| 6,858,310 | B2 | 2/2005 | McGee et al. |
| 6,896,926 | B2 | 5/2005 | Qiu et al. |
| 6,902,812 | B2 | 6/2005 | Valint, Jr. et al. |
| 2002/0006521 | A1 | 1/2002 | Shimoyama et al. |
| 2002/0012755 | A1* | 1/2002 | Hodgkin et al. ............ 427/488 |
| 2002/0120084 | A1 | 8/2002 | Valint, Jr. et al. |
| 2003/0039748 | A1 | 2/2003 | Valint, Jr. et al. |
| 2003/0068433 | A1 | 4/2003 | McGee et al. |
| 2003/0109390 | A1 | 6/2003 | Salpekar et al. |
| 2003/0171499 | A1* | 9/2003 | Grobe, III ................ 525/326.4 |
| 2003/0235604 | A1 | 12/2003 | McGee et al. |
| 2004/0114105 | A1 | 6/2004 | Shimoyama et al. |
| 2005/0206309 | A1* | 9/2005 | Shibasaki et al. ............ 313/504 |
| 2006/0142410 | A1 | 6/2006 | Baba et al. |
| 2006/0157453 | A1 | 7/2006 | Dumont et al. |

FOREIGN PATENT DOCUMENTS

| | | |
|---|---|---|
| DE | 10064096 A1 | 12/2000 |
| DE | 20209329 | 9/2002 |
| EP | 0068800 | 1/1983 |
| EP | 0108886 | 5/1984 |
| EP | 0124017 | 11/1984 |
| EP | 0232986 | 8/1987 |
| EP | 0276631 | 8/1988 |
| EP | 0358447 | 3/1990 |
| EP | 0378511 | 7/1990 |
| EP | 0432970 | 6/1991 |
| EP | 0434362 | 6/1991 |
| EP | 0713106 | 5/1996 |
| EP | 0758687 | 2/1997 |
| EP | 0765721 | 4/1997 |
| EP | 0765733 | 4/1997 |
| EP | 0770474 | 5/1997 |
| EP | 0830865 | 3/1998 |
| EP | 0836111 | 4/1998 |
| EP | 0856400 | 8/1998 |
| EP | 0989418 | 3/2000 |
| EP | 1048304 | 11/2000 |
| EP | 1154287 | 11/2001 |
| EP | 1163914 | 12/2001 |
| EP | 1336415 | 8/2003 |
| EP | 1582910 | 10/2005 |
| EP | 1611883 | 1/2006 |
| FR | 2840826 | 6/2002 |
| GB | 1584884 | 1/1981 |
| GB | 2386847 | 2/2003 |
| JP | 56-095932 | 8/1981 |
| JP | 01-167726 | 7/1989 |
| JP | 01-253710 | 10/1989 |
| JP | 01-295216 | 11/1989 |
| JP | 02-220024 | 9/1990 |
| JP | 02-278224 | 11/1990 |
| JP | 03-015816 | 1/1991 |
| JP | 03-039928 | 2/1991 |
| JP | 03-098014 | 4/1991 |
| JP | 03-102313 | 4/1991 |
| JP | 03-125115 | 5/1991 |
| JP | 03-130718 | 6/1991 |
| JP | 03-131819 | 6/1991 |
| JP | 03-137056 | 6/1991 |
| JP | 03-217815 | 9/1991 |
| JP | 03-217816 | 9/1991 |
| JP | 03-235914 | 10/1991 |
| JP | 04-053921 | 2/1992 |
| JP | 04-067012 | 3/1992 |
| JP | 04-104121 | 4/1992 |
| JP | 04-104220 | 4/1992 |
| JP | 04-112157 | 4/1992 |
| JP | 04-179916 | 6/1992 |
| JP | 04-316013 | 11/1992 |
| JP | 04-338713 | 11/1992 |
| JP | 04-370122 | 12/1992 |
| JP | 05-107512 | 4/1993 |
| JP | 05-295391 | 11/1993 |
| JP | 06-122779 | 5/1994 |
| JP | 06-289333 | 10/1994 |
| JP | 07-056127 | 1/1995 |
| JP | 07-138392 | 5/1995 |
| JP | 08-227001 | 9/1996 |
| JP | 10-289952 | 10/1998 |
| JP | 2001-117054 | 4/2001 |
| JP | 2001-233922 | 8/2001 |
| JP | 2002-047365 | 2/2002 |
| JP | 2002-363447 | 12/2002 |
| JP | 2003-225311 | 8/2003 |
| WO | WO 93/05699 | 4/1993 |
| WO | WO 94/15729 | 7/1994 |
| WO | WO 95/00615 | 1/1995 |
| WO | WO 95/00617 | 1/1995 |
| WO | WO 95/00620 | 1/1995 |
| WO | WO 95/10523 | 4/1995 |
| WO | WO 95/17492 | 6/1995 |
| WO | WO 95/25287 | 9/1995 |
| WO | WO 96/36890 | 11/1996 |
| WO | WO 98/55155 | 12/1998 |
| WO | WO 99/57177 | 11/1999 |
| WO | WO 00/37545 | 6/2000 |
| WO | WO 00/71611 | 11/2000 |
| WO | WO 00/71612 | 11/2000 |
| WO | WO 00/71613 | 11/2000 |
| WO | WO 01/82984 | 11/2001 |
| WO | WO 02/22186 | 3/2002 |
| WO | WO 02/48300 | 6/2002 |

| WO | WO 2005/003237 | 1/2005 |
| --- | --- | --- |
| WO | WO 2005/014074 | 2/2005 |
| WO | WO 2006/039466 | 4/2006 |

OTHER PUBLICATIONS

Lin, Sicong, et al., Ozone-induced grafting phosphorylcholine polymer onto silicone film grafting 2-methacryloyloxyethyl phosphorylcholine onto silicone film to improve hemocompatibility, Colloids and Surfaces B: Biointerfaces, Jul. 15, 2003, pp. 215-223, vol. 30-3, Elsevier, Netherlands.

Razavi, Ali, Plasma surface modification of polymeric materials, Materials Research Society Symposium Proceedings, 2006, pp. 211-214, vol. 890, Boston, MA.

Rebeix, V, et al., Artificial tear adsorption on soft contact lenses: methods to test surfactant efficacy, Biomaterials, Jun. 2000, pp. 1197-1205, vol. 21-12, Elsevier, England.

Doell, G B, et al., Contact lens surface changes after exposure to surfactant and abrasive cleaning procedures., Am J Optom Physiol Opt, Jun. 1986, pp. 399-402, vol. 63-3, Williams and Wilkins, United States.

Ketelson, Howard A, et al., Dynamic wettability properties of a soft contact lens hydrogel, Colloids Surf B Biointerfaces, Jan. 15, 2005, pp. 1-9, Elsevier, Netherlands.

Meadows, D. L., et al., Dynamic wetting behavior of pHEMA-MAA and silicone hydrogel contact lenses, Annual Meeting of the Association-for-Research-in-Vision-and-Ophthalmology, Apr. 2004, p. U578, vol. 45, Assoc Res Vis & Ophthalmol, Fort Worth, TX.

Tomlinson, A., et al., Effect of Different Soft Contact Lens Materials on the Tear Film, Annual Meeting of the Association for Research in Vision and Ophthalmology, 2002, Abs. No. 3083, vol. 2002, Glasgow, UK.

Unless, N, et al., Formulation studies of the wetting solutions for hard contact lenses. 1. Microbiological studies, Mikrobiyol Bul, 1981, pp. 179-187, vol. 15-3-4, Ankara Mikrobiyoloji Dernegi, Turkey.

Majumdar, Sudipto, High Permeability, Long-Wear Contact Lens Materials, National Eye Institute, 2002.

Ou, S. H., et al., Investigation of ethylene-vinyl alcohol copolymers for surface modification of contact lenses., Journal of Polymer Science, Part B: Polymer Physics, Jan. 1, 1991, Pub No. 051764, John Wiley & Sons.

Huff, J.W., et al., Parameter and environmental influences on rigid contact lens wettability., Am J Optom Physiol Opt, Sep. 1988, pp. 717-721, vol. 65-9, Williams and Wilkins, United States.

Valint, Paul L., Jr., et al., Plasma surface treatment of silicone hydrogel contact lenses with a flexible carbon coating., Official Gazette of the United States Patent and Trademark Office Patents, Apr. 10, 2001, vol. 1245-2, USPTO, United States.

Justis, Nicole B., Polyelectrolyte surface modification and permeability of bio-inspired dynamic fluidic lenses, Materials Research Society Symposium Proceedings, 2004, pp. 335-341, vol. EXS-1, Materials Research Society, Boston, MA.

Fatt, I, Prentice Medal lecture: contact lens wettability—myths, mysteries, and realities., Am J Optom Physiol Opt, Jul. 1984, pp. 419-430, vol. 61-7, Williams and Wilkins, United States.

McGee, Joseph A., et al., Renewable surface treatment of silicone medical devices with reactive hydrophilic polymers., Official Gazette of the United States Patent and Trademark Office Patents, Feb. 22, 2005, USPTO, United States.

Valint, P.L. Jr., et al., Surface-active macromonomers for coating of contact lens polymers., The 1997 Spring ACS Meeting, Apr. 13-17, 1997, pp. 93-94, vol. 76, San Francisco, CA.

Johnston, Erika Ellen, Surface and Biological Properties of Biofouling-resistant, Poly(Ethylene Oxide)-Like Plasma Deposited Films (Bacterial Attachement, Surface Treatments), The Sciences and Engineering, 1997, pp. 6698-6961, vol. 58-12B.

Chen, X.D., et al., Surface modification of silicone rubber by methanol plasma, Proceedings of the 1996 5th World Biomaterials Congress. Part 2 (of 2), May 29-Jun. 2, 1996, p. 821, vol. 2, Transactions of the Annual Meeting of the Society for Biomaterials in conjunction with the International Biomaterials Symposium, Toronto, Canada.

Deng, X M, et al., Surface modification of soft contact lenses: silanization, wettability and lysozyme adsorption studies., Biomaterials, Jul. 1986, pp. 247-251, vol. 7-4, Elsevier, England.

Sunny, M C, et al., Surface modification of corneal contact lens with phosphoryl choline by glow discharge., Biomater Artif Cells Immobilization Biotechnol, 1991, pp. 599-612, vol. 19-3, International Society for Artificial Cells and Immobilization Biotechnology, United States.

Bi, Jingjing, Synthesis and Modification of a Highly Permeable Polymer (Poly(Trimethylsilylpropyne), Contact Lens), The Sciences and Engineering section, 1998, p. 4078, vol. 60-08B.

Declerq, S.S., The coating agent on the corneal contact lens in electroretinography., Am J Ophthalmol, Feb. 1977, pp. 267-271, vol. 83-82, Elsevier, United States.

Benedetto, D A, et al., The dynamic film thickness of cushioning agents on contact lens materials., Ann Ophthalmol, Apr. 1978, p. 437-42, vol. 10-4, United States.

Tonge, S, et al., The ex vivo wettability of soft contact lenses., Curr Eye Res, Jul. 2001, pp. 51-59, vol. 21-1, Informa Healthcare, England.

Lukes, J, et al., The surface treatment of polypropylene molds and its effect on the quality of cast contact lenses., J Appl Biomater, 1992, pp. 275-279, vol. 3-4, Wichtig Editore, United States.

Radke, C. J., et al., Wettability of Soft Contact Lenses Exposed to Tear Film Components., Annual Meeting of the Association for Research in Vision and Ophthalmology, 2003, Abstract No. 3684, vol. 2003, Association for Research in Vision and Ophthalmology, United States.

Poster, M G, Wetting angles of rigid contact lens plastics: the effect of contact lens wear. J Am Optom Assoc, pp. 452-454, vol. 57-6, United States.

Razavi, Ali, Plasma surface modification of polymeric materials., Surface Engineering for Manufacturing Applications, 2006, pp. 211-215, vol. 890, Materials Research Society, Warrendale, PA.

Shirai, M., et al., Surface modification resists using photoacid and photobase generating polymers, Journal of Photopolymer Science and Technology, 2000, pp. 531-534, Vo. 13-4, Tech. Assoc. Photopolymers, Japan.

Jian-Ping Xu, et al., The effect of formation of the liquid crystalline phase on the blood compatibility of a cholesterol modified silicone, Journal of Materials Science: Materials in Medicine, Mar. 2005, pp. 277-282, vol. 16-3, Kluwer Academic Publishers, United States.

Bradley, R.H., et al., Isopropyl alcohol plasma modification of polystyrene surfaces to influence cell attachment behaviour, Surface Science, Aug. 13, 2004, pp. 110-120, vol. 561-1, Elsevier.

Gil'Man, A. B., Low-Temperature Plasma Treatment as an Effective Method for Surface Modification of Polymeric Materials, High Energy Chemistry, Jan. 1, 2003, pp. 17-23, vol. 37-1, MAIK Nauka/Interperiodica, Russia.

Dmitriev, S. N., et al., Modification of polyethyleneterephthalate track membranes surface by plasma of allyl alcohol, 1997. 14 pgs., Khimiya Vysokikh Ehnergij, Russia.

Mas, A., et al., Surface Modification of Poly(Hydroxybutyrate-Co-9% Hydroxyvalerate) by Allylic Alcohol Plasma Polymerisation, Eur.Polym.J. 1997, pp. 331-337, vol. 33-3.

Weikart, C.M., et al., Evaluation of plasma polymer-coated contact lenses by electrochemical impedance spectroscopy., J. Biomed. Mater. Res., Mar. 15, 2001, pp. 597-607, vol. 54-4, Wiley.

Chu, P.K., et al., Plasma-surface modification of biomaterials, Materials Science and Engineering: R: Reports, Mar. 29, 2002, pp. 143-206, vol. 36-5/6, Elsevier.

Ho, C.P., et al., Ultrathin coating of plasma polymer of methane applied on the surface of silicone contact lenses., J. Biomed. Mater. Res., Oct. 22, 1988, pp. 919-937, vol. 10, Wiley.

Mitchell et al., *Isopropyl alcohol plasma modification of polystyrene surfaces to influence cell attachment behaviour*, Journal of Surface Science, vol. 561, No. 1, pp. 110-120, 2004.

Chen et al., *Surface Modificaiton of Silicone Rubber by Methanol Plasma*, Proceedings of 5th World Biomaterials Congress, p. 821, May 29-Jun. 2, 1996.

Dai et al., *Surface Modification by Plasma Etching and Plasma Patterning*, J. Phys. Chem. B., vol. 101, No. 46, pp. 9548-9554, 1997.

Vargo et al., *Monolayer Chemical Lithography and Characterization of Fluoropolymer Films*, Langmuir, vol. 8, No. 1, pp. 130-134, 1992.

\* cited by examiner

SURFACE MODIFICATION OF CONTACT LENSES

CROSS-REFERENCE TO RELATED APPLICATIONS

This application claims the benefit of priority under 35 U.S.C. §119(e) of U.S. Provisional Application No. 61/153,588, filed on Feb. 18, 2009 and entitled, "SURFACE MODIFICATION OF CONTACT LENS," the entirety of which is incorporated herein by reference.

BACKGROUND

1. Field

Embodiments of the present invention relate generally to polymer articles for medical devices which provide improved hydrophilicity in such articles, for example, ophthalmic devices and other suitable medical and non-medical devices.

2. Description of the Related Art

The field of vision correction has involved measuring aberrations in the optics of the eye, by first creating a prescription that corrected for the measured aberrations, and then using the prescription to correct the measured aberration, e.g., by surgery, spectacles or contact lenses. Vision correction has further involved proper fitting of spectacles and contact lenses to ensure patient comfort.

Patient comfort is of particular concern in the case of contact lenses, which are worn on the patient's eye. Comfort can be related to the affinity of the surface of the lens for water (e.g., the patient's tears). If the lens has relatively low affinity for tears (hydrophobicity), tears coming into contact with the surface of the lens may tend to bead up, rather than spread out. As a result, the surface of the lens may be relatively dry and may rub against the patient's cornea and eye lids, creating a sense of discomfort for the patient when wearing the lens. Alternatively, if the lens has relatively high affinity for tears (hydrophilicity), tears coming into contact with the surface of the lens may tend to spread out uniformly and the surface of the lens may be relatively wet. As a result, lens may float above the cornea on the lacrimal (tear) reservoir without rubbing against the cornea, creating a sense of comfort for the patient when wearing the lens. Thus, it is desirable to develop contact lens systems which possess improved wetability.

SUMMARY

In an embodiment, a method of increasing the hydrophilicity of a polymer surface is provided. The method comprises exposing a polymer substrate to a first plasma under conditions selected to generate free radicals on a surface of the polymer substrate. The method further comprises reacting an organic compound with the free radicals on the surface of the polymer substrate to thereby form an organic coating. The method additionally comprises exposing the organic coating to a second plasma under conditions selected to oxidize the organic coating to thereby form a hydrophilic layer at the substrate surface.

In another embodiment, a method of reducing the hydrophobicity of a contact lens surface is provided. The method comprises providing a contact lens. The method further comprises exposing the contact lens to a first plasma under conditions selected to generate free radicals on a surface of the contact lens. The method additionally comprises contacting an organic compound with the free radicals on the surface of the contact lens under conditions selected to form a hydrophilic surface on the contact lens, the hydrophilic surface having a contact angle with respect to water that is less than about 50°.

These and other embodiments are described in greater detail below.

DETAILED DESCRIPTION

Embodiments of the present disclosure provide methods for modifying the surface of polymer substrates in order to enhance the affinity of such surfaces for water. Specifically, the enhanced affinity for water, also referred to as hydrophilicity or wetability, may achieved through a plurality of operations. The polymer surface may be prepared so as to react with an organic compound to form an organic coating on the polymer surface. The organic coating may be further oxidized under conditions selected to form a hydrophilic layer at the polymer surface. In this manner, water coming into contact with the polymer surface may spread out more readily out along the surface of the polymer surface.

In certain embodiments discussed herein, the polymer substrates may be discussed in the context of contact lenses and portions thereof. Increasing the hydrophilicity of contact lenses may enable water and/or other aqueous solutions (e.g., tears) spread along the contact lens surface to act as a lubricating layer which enhances the patient's comfort when the contact lens is worn. It will be understood, however, that the disclosed embodiments may be extended to other polymeric substrates without limit.

The term "organic compound" as used herein has its ordinary meaning as known to those skilled in the art, and thus includes reference to carbon-containing molecular species having various forms of molecular substitution and architecture, e.g., cyclic, linear, branched, saturated, unsaturated, and/or optionally halogenated, unless the context indicates otherwise. For example, reference herein to a particular group, (e.g., a $C_1$-$C_{20}$ alkyl group) will be understood to include branched, linear, cyclic, and optionally halogenated embodiments of that group.

In certain embodiments, described in greater detail below, the organic compound may be selected from the group consisting of a $C_1$-$C_{20}$ alcohol, a $C_1$-$C_{20}$ ether, a $C_1$-$C_{20}$ aldehyde, a $C_1$-$C_{20}$ ketone, a $C_1$-$C_{20}$ ester, a $C_1$-$C_{20}$ alkyl, a $C_2$-$C_{20}$ alkenyl, a $C_6$-$C_{20}$ aryl, a $C_1$-$C_{20}$ organosilicon compound, a $C_1$-$C_{20}$ organosilane compound, a $C_1$-$C_{20}$ organophosphorous compound, a $C_1$-$C_{20}$ organotitanium compound, a $C_1$-$C_{20}$ organotin compound, a $C_1$-$C_{20}$ organogermanium compound, and a $C_1$-$C_{20}$ organoboron compound.

Plasmas may be employed in the surface modification process. In one embodiment, the contact lens surface may be exposed to a first plasma under conditions selected to generate free radicals on the lens surface. This invention is not limited by theory of operation, but it is believed that such generation of free radicals is a surface activation that may enable the organic species to react with the lens surface so as to form the organic coating on the lens surface. In another embodiment, a second plasma, the same or different from the first, may also be employed to oxidize the organic coating to form the hydrophilic layer at the lens surface.

As further illustrated below, wetability of contact lenses, as evaluated through contact angle measurements, exhibits significant improvement with surface modification. For example, while untreated contact lens surfaces exhibit contact angles greater than about 90°, lens surfaces that are modified according to embodiments of the disclosed surface modification processes exhibit contact angles less than about 50°. These results indicate that embodiments of the surface modification processes significantly improve the affinity of the treated surfaces of modified contact lenses for water.

Contact angles of surface modified lenses were also evaluated in a rub test study simulating six months of patient wear. Substantially no change in contact angle is observed in the lenses, further illustrating that the surface modification processes disclosed herein provide hydrophilic coatings which bond strongly to the underlying contact lens and possess high mechanical durability. These and other advantages of the disclosed processes are discussed in greater detail below.

The term "soft contact lens" as used herein has its ordinary meaning as known to those skilled in the art and thus includes contact lenses made of flexible plastic materials, including, but not limited to, hydrogel materials, such as silicone hydrogels.

The term "hard contact lens" as used herein has its ordinary meaning as known to those skilled in the art and thus includes contact lenses that retain their form without support, as compared with soft contact lenses which readily yield to pressure. Hard contact lenses may further include rigid gas permeable (RGP) contact lenses which possess improved oxygen permeability. Hard contact lenses may be formed of materials including, but not limited to, polymethylmethacrylate (PMMA), fluoro silicone acrylate, and methacrylate.

The term "hybrid contact lens" as used herein has its ordinary meaning as known to those skilled in the art and thus includes a variety of contact lenses adapted for positioning on the surface of the eye. The hybrid contact lenses may comprise a substantially rigid center portion and a substantially flexible skirt portion disposed about the periphery of the center portion. Hybrid contact lenses have the benefit of visual acuity of the hard RGP and the comfort of the soft lenses. In some embodiments, the skirt portion may comprise a substantially flexible annular portion coupled to the substantially rigid center portion at a junction defined at least in part by an outer edge of the substantially rigid center portion. Further discussion of materials and methods of manufacture of hybrid contact lenses are provided in U.S. Pat. Nos. 7,104, 648 and 7,543,936, each of which are hereby incorporated by reference in their entirety, and particularly for the purpose of describing such materials and methods of manufacture.

The term "contact angle" as used herein has its ordinary meaning as known to those skilled in the art. The contact angle of a liquid (e.g., water, saline) lying upon a surface is the angle between the surface and the tangent to a drop or bubble of the liquid on that surface at the point of interface, measured from the liquid side of the bubble or drop. In certain embodiments, the contact angle may be measured according to ANSI AZ80.20-2004.

Those skilled in the art will further understand that references herein to particular monomeric materials to be references to such monomers as well as to both cross-linked and uncross-linked versions of polymers (including copolymers) synthesized by polymerizing or copolymerizing the recited monomers, unless clearly stated otherwise.

Figure 1A:
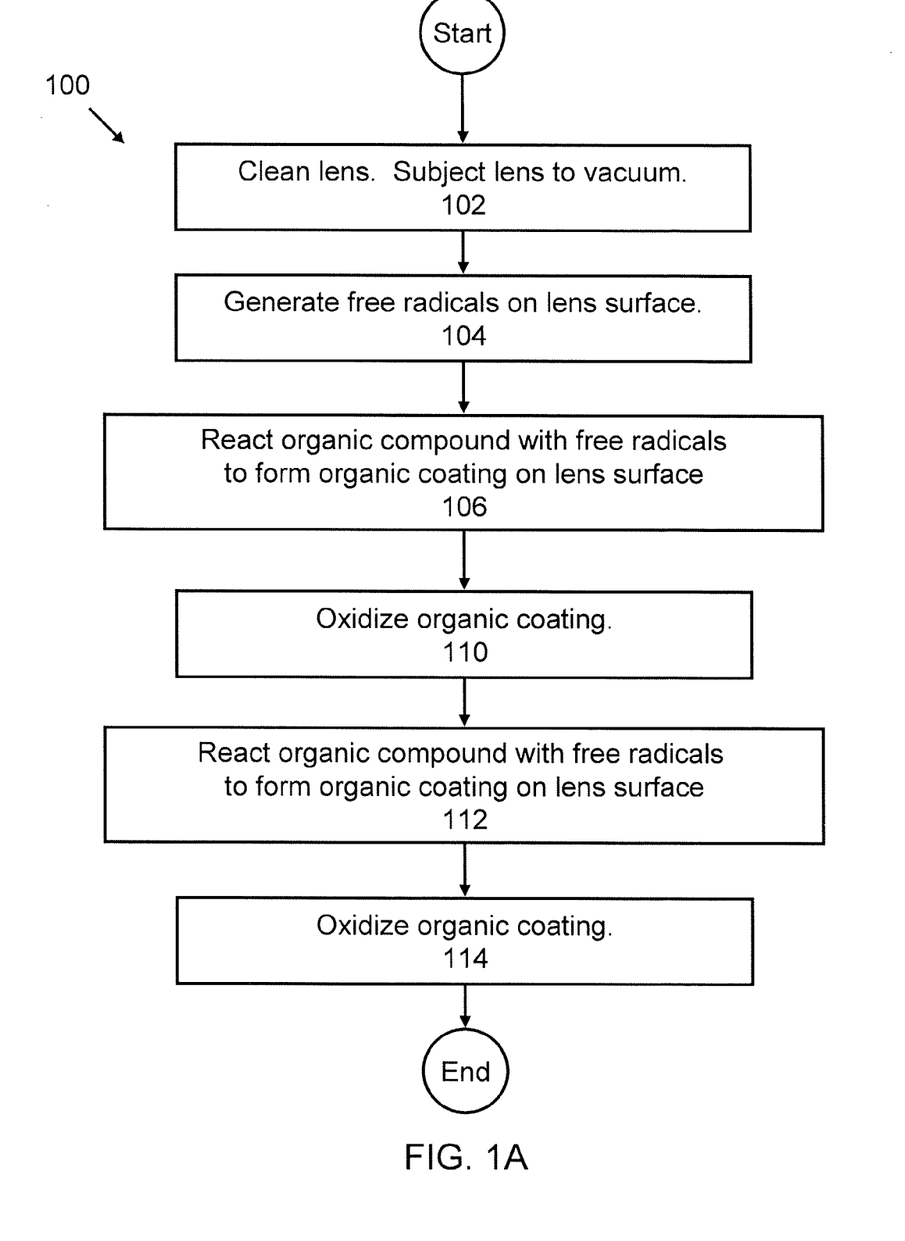
FIGS. 1A-1B are flow diagrams of embodiments of methods for fabricating contact lenses having improved wetability; (1A) two-step coating process for treating opposite sides of a contact lens; (1B) single-step process for treating either a single side or both sides of a contact lens.
Figure 1B:
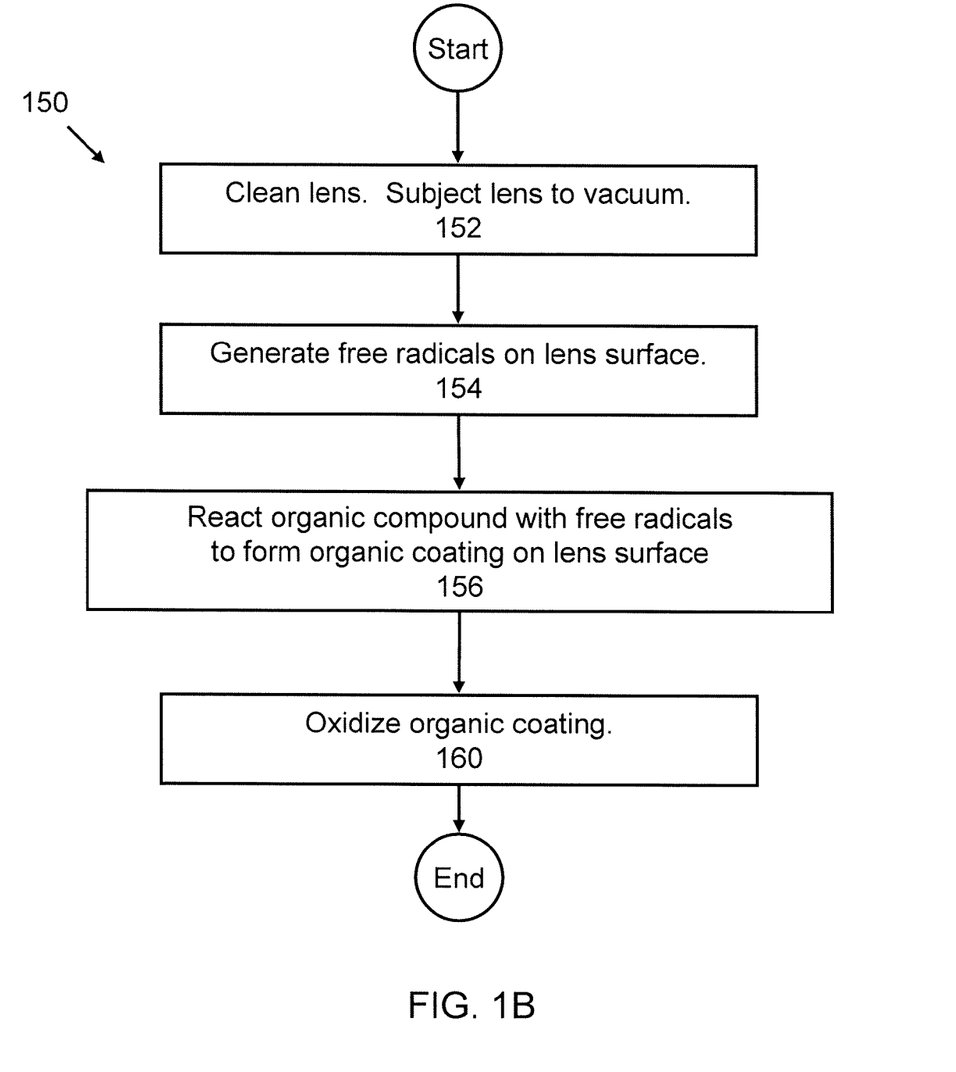

FIGS. 1A and 1B illustrate flow diagrams illustrating embodiments of methods 100, 150 for fabricating contact lenses having improved wetability. The methods 100, 150 will be discussed with reference to FIG. 2. In certain embodiments, the methods 100, 150 may be performed on any type of polymer material, including, but not limited to, contact lenses and portions thereof. Contact lenses may include but are not limited to, soft contact lenses, hard lenses, and hybrid contact lenses. It may be understood that the methods 100, 150 may be performed with greater or fewer operations than those illustrated in FIGS. 1A, 1B and the sequence of steps of operations of methods 100, 150 may be altered as desired.

The method 100 of FIG. 1A presents one embodiment of a process for manufacturing a contact lens having improved wetability in which opposing sides of the lens are subjected to coating and oxidation separately. Embodiments of the method 100 may be referred to herein as two-step coating processes. In certain embodiments, the method 100 may be performed with the contact lens or disc oriented in a substantially horizontal geometry. For example, in one embodiment, the operations described in blocks 102-110 may be employed to provide a substantially continuous hydrophilic layer on at least a portion of the contact lens surface which improves the wetability of the lens portion which is coated with the hydrophilic layer. In certain embodiments, the lens may be placed in a concave up orientation during the operations of blocks 102-110 and in a concave down orientation during the operations of blocks 112-114. In alternative embodiments, these orientations may be reversed for the respective operations of blocks 102-110 and 112-114.

As discussed in greater detail below, the method 150, illustrated in FIG. 1B, present one embodiment of a process for manufacturing a contact lens having improved wetability in which opposing sides of the lens are subjected to coating and oxidation separately or a single side of the lens is subjected to coating and oxidation. Embodiments of the method 100 may be referred to herein as single-step coating processes. In certain embodiments, during the operations of blocks 152-160, the contact lens may be oriented horizontally in a concave down or concave up geometry. In other embodiments, the contact lens may be oriented in a vertical geometry.

Figure 2:
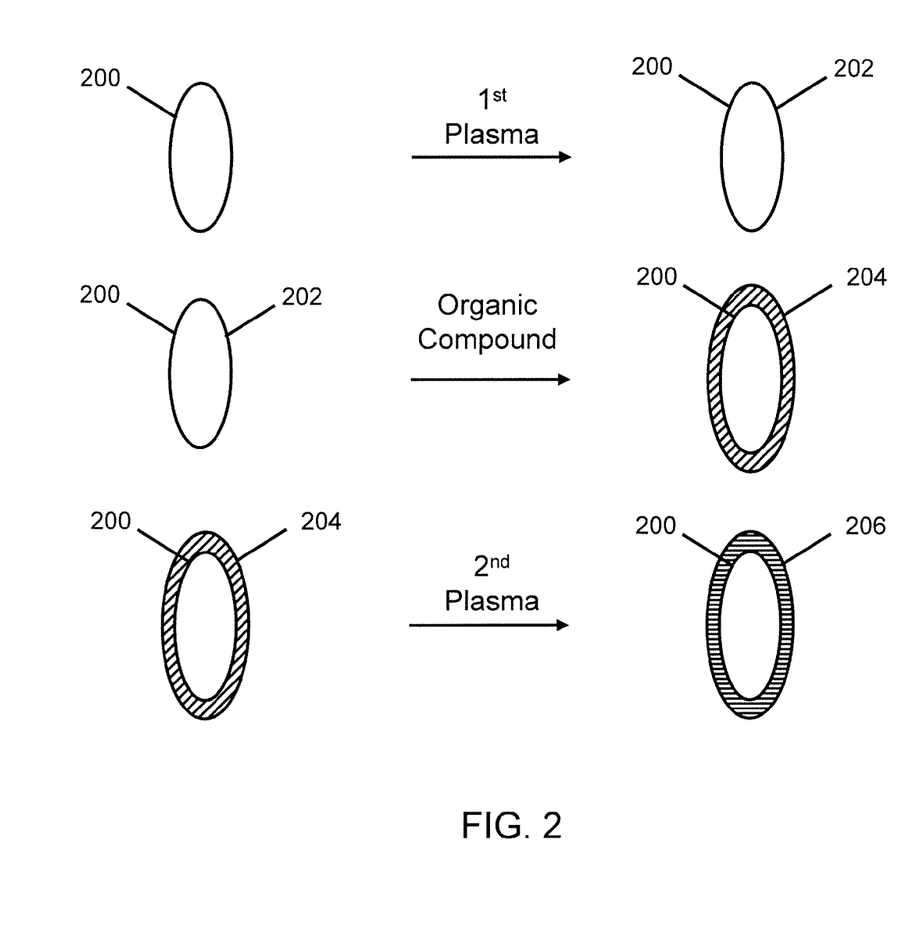
FIG. 2 is a schematic illustration of one embodiment of a reaction sequence for forming a hydrophilic layer on the surface of a contact lens from an organic compound that imparts improved hydrophilicity to the contact lens.

Referring to FIG. 1A and FIG. 2, the method 100 begins in block 102 where a contact lens 200 may be cleaned, placed into a substantially airtight chamber, and subjected to a vacuum. The cleaning and vacuum may be performed under conditions which substantially remove moisture and/or contaminants from the surface of the lens 200 (e.g., water, oils, and the like). In one embodiment, the lens 200 may be cleaned with an acidic or basic solution (e.g., 5% aqueous sodium bicarbonate solution) and then rinsed thoroughly with water to remove the solution. In another embodiment, the lens 200 may be cleaned with a surfactant (e.g., a 2% aqueous surfactant solution). Examples of surfactants may include commercially available formulations such that available under the trade name Micro 90. After cleaning, the lens 200 may be subjected to vacuum in the range of about 40 mtorr to about 80 mtorr for a time in the range of about 10 min to about 45 min to substantially remove water on the lens surface. For example, a vacuum pressure of about 80 mtorr for about 15 minutes may be employed.

The lens 200 may be exposed to plasma in block 104 in order to generate free radicals on the lens surface 202, also referred to herein as plasma activation. In one embodiment, the plasma may be one of an oxygen plasma, a nitrogen plasma, an ozone plasma, and a hydrogen peroxide plasma. In certain embodiments, hydrogen peroxide plasmas may be provided from solutions of hydrogen peroxide. In certain embodiments, the plasma treatment may be performed using any plasma chamber as known in the art. The flow rate of the feed gas for the plasma (e.g., oxygen, nitrogen, ozone, hydrogen peroxide, and the like) may be in the range between about 100 cc/min to about 300 cc/min, for example, about 100 cc/min to about 150 cc/min. The pressure of the feed gas may be in the range between about 200 mtorr to about 350 mtorr. The power applied to the plasma may be in the range between about 100 Watts to about 600 Watts, for example, about 150 Watts to about 500 Watts, and about 200 to 300 Watts. The time of the plasma activation may be in the range between about 10 seconds to about 2 min, for example, about 1 minute.

In block 106, an organic compound may be reacted with the activated contact lens. In one embodiment, the organic material may be a material comprising the functional form R—O—R', where, R and R' are each independently selected from H, linear $C_1$-$C_{10}$ alkyl, branched $C_1$-$C_{10}$ alkyl, cyclic $C_3$-$C_{10}$ alkyl, linear $C_2$-$C_{10}$ alkenyl, branched $C_2$-$C_{10}$ alkenyl, and cyclic $C_3$-$C_{10}$ alkenyl, with the proviso that R and R' may not both be selected to be H; or R and R' may be joined together to form a $C_4$-$C_5$ cyclic ether. For example, the organic material may comprise alcohols and ethers. Examples of alcohols may include, but are not limited to, methanol, ethanol, propanol, isopropanol, butanol, tertbutyl alcohol, hexanol, pentanol, 3-buten-1-ol, allyl alcohol, and the like. In other embodiments, the ethers may comprise diethyl ether, methyl ethyl ether, and tetrahydrofuran (THF).

In another embodiment, the organic material may be a ketone of the formula R—(C=O)—R' or an ester of the formula R—(C=O)—OR', where R and R' are independently selected from H, linear $C_1$-$C_{10}$ alkyl, branched $C_1$-$C_{10}$ alkyl, cyclic $C_3$-$C_{10}$ alkyl, linear $C_2$-$C_{10}$ alkenyl, branched $C_2$-$C_{10}$ alkenyl, and cyclic $C_3$-$C_{10}$ alkenyl; or R and R' may be joined together to form a cyclic $C_3$-$C_6$ ketone or $C_3$-$C_6$ lactone.

For example, the organic material may comprise one or more of aldehydes, ketones, and esters. Examples of aldehydes may include, but are not limited to, butrylaldehyde, acetaldehyde, propionaldehyde, pentanal, and hexanal. Examples of ketones may include 2-butanone, acetone, diethyl ketone, ethyl methyl ketone, dipropyl ketone, cyclohexanone, and cyclohexenone. Examples of acids, acid anhydrides and esters may include carboxylic acids, propionic acid, ethyl acetate, methyl acetate, propyl acetate, ethyl propionate, methyl propionate, ethyl butyrate, cyclohexyl acetate.

In a further embodiment, the organic compound may be selected from the group consisting of a $C_1$-$C_{20}$ organosilicon, a $C_1$-$C_{20}$ organosilane compound, a $C_1$-$C_{20}$ organophosphorous compound, a $C_1$-$C_{20}$ organotitanium compound, a $C_1$-$C_{20}$ organotin compound, a $C_1$-$C_{20}$ organogermanium compound, and a $C_1$-$C_{20}$ organoboron compound. Examples of such compounds may include, but are not limited to, vinyltrimethylsilane, vinyl triethyl silane, vinyl trimethoxy silane, vinyl triethoxy silane, vinyltripopoxysilane, vinylpentamethyldisiloxane, vinylmethyldiacetoxysilane, methyacryloxypropyl trimethoxysilane, vinyl or alkyl trimethylsilane, methacryloxy propyl tris[trimethylsiloxy]silane titanium ethoxide, titanium isopropoxide, diacetoxy di-tert-butoxy silane, heptamethyltricyloxane, organo germanium, organotin, boron organo materials, and diethylphosphite, diethylphosphatoethyltriethoxysilane, dimethyl(trimethylsilyl) phosphate and trimethylphosphate.

In certain embodiments, antimicrobial organotin compounds may be used in surface modification of contact lenses to inhibit bacteria growth. In one embodiment, the antimicrobial compounds may be organotin, organogermanium, and organoboron compounds. Examples of organotin compounds may include, but are not limited to, bis(triethyltin)oxide, tetra methyl tin, chloromethyltrimethyltin, diallylbromotin, diallydi-n-butyltin and other liquid organometallic tin compound liquid halogenated organometallic tins. Examples of organogermanium compounds may include, but are not limited to, tetraalkylgermane (e.g, tetramethylgermane, tetraethylgermane, tetralkenylgermane), alkenyltrialkylsilane, alkenyltrialkoxylsilane, vinyl trialkylgermane, vinyltrialkenylgermane, vinyltrialkoxygermane, tetraalkoxygermane (e.g., tetraethoxyoxygermane), alkyltrialkoxygermane (e.g., methyltrimethoxygermane), methacyloxyalkyltrialkylgermane (e.g., methacryloxyacryloxy methyltrimethylgermane, methacyloxyacryloxytrialkygermane). Examples of organoboron compounds may include, but are not limited to, boron allyloxide, boron n-butoxide, boron ethoxide, and boron t-butoxide.

In various embodiments, the organic compound may be saturated or unsaturated, linear, cyclic or branched, and/or optionally halogenated, e.g., may be optionally halogenated straight or branched alkanes, alkenes or alkynes.

As illustrated FIG. 2, in one embodiment, after surface activation, the organic compound may participate in one or more free radical reactions, resulting in the formation of an organic layer 204 at the contact lens surface 202. For example, the first plasma may be removed from the chamber containing the contact lens 200 and a flow of the organic material in a gaseous state may be introduced into the chamber. The flow rate of the organic material may be in the range between about 10 cc/min to about 150 cc/min. The pressure of the organic material may be in the range between about 250 mtorr to about 500 mtorr. The flow of the organic material may be further subjected to an alternating electric field at a power that may be in the range between about 200 Watts to about 500 Watts. The flow of the organic compound within the chamber containing the lens may be maintained for a time in the range between about 2.5 minutes to about 10 minutes.

In alternative embodiments, the lens surface activation, introduction of the organic compound, and reaction operations may be performed in a single step. For example, the organic compound may be introduced with the plasma. The plasma and deposition parameters may be employed as discussed above.

In block 110, the contact lens coated with the organic layer 204 may be oxidized. The coating may be oxidized under conditions selected to form a hydrophilic layer 206 at the surface 202 of the lens. In one embodiment, oxidation may be performed using plasma. The plasma may be continuous or pulsed, where pulsing refers to interrupted operation of the plasma (e.g., turning the plasma on and off) during the oxidation process. Examples of plasmas may include, but are not limited to, an oxygen plasma ($O_2$ plasma), an ozone plasma ($O_3$ plasma), and a hydrogen peroxide plasma ($H_2O_2$ plasma). In one embodiment, the flow rate of the feed gas for the plasma may be in the range between about 50 cc/min to about 250 cc/min, for example, about 100 cc/min to about 150 cc/min. The power applied to the plasma may be in the range between about 100 Watts to about 600 Watts, for example, in the range between about 200 Watts to about 450 Watts. The plasma oxidation time may be in the range between about 5 seconds to about 60 seconds, for example, about 5 seconds to about 30 seconds continuously. In another example, the plasma oxidation time may be in the range from about 5 seconds to about 10 seconds continuously. In embodiments where the plasma is pulsed, the duty cycle of the plasma may be varied as necessary to achieve the hydrophilic layer at the contact lens surface, for example, about one-half. The time of pulsed plasma oxidation may be in the range between about 15 seconds to about 45 seconds.

In alternative embodiments, the oxidation may be performed using a chemical reaction such as different concentration of hydrogen peroxide or other non toxic oxidizing agents.

In embodiments of the surface modification processes discussed herein may provide contact lenses which exhibit significantly improved wetability. For example, as discussed in greater detail below in the examples, contact angles less than about 50°, less than about 40°, less than about 30°, or less than about 20°, with respect to water are measured after lenses are subjected to the surface modification process. In contrast, untreated or as-received contact lenses (e.g., soft, hard, and hybrid lenses) can have contact angles greater than about 90°. Therefore, embodiments of the disclosed surface modification processes may significantly improve the wetability of contact lenses. For example, the contact angle of a lens may be reduced by more than 50% as compared to their unmodified or as-received condition. In many cases, the reduction in the contact angle of a lens subjected to embodiments of the disclosed surface treatments may be significantly more, such as over 60% or over 70% as compared to the lens in the as-received condition. The reduction in contact angle significantly improves the wetability of the lens and interaction with tears and enhancing the comfort of the patient during wear.

After completing the operation of block 110, the horizontally oriented contact lens is repositioned such that the opposing side is oriented upwards. The operations of blocks 112-114 are then performed as discussed above with respect to blocks 106 and 110. The improvements in contact angle achieved in the operations of blocks 102-110 in a first side of the contact lens may generally be achieved in performing the operations of blocks 112-114 on a second side of the lens.

In alternative embodiments, as illustrated in FIG. 1B, the hydrophilicity of a contact lens may be improved in single deposition and oxidation operations. To perform the single deposition method 150 illustrated in FIG. 1B, the contact lens may, in one embodiment, be oriented vertically. In alternative embodiments, the contact lens may either be oriented horizontally in a concave up or concave down orientation. The operations of blocks 152-160 of the method 150 may be performed as discussed above with respect to the operations of blocks 102-110 of the method 100.

EXAMPLES

In the following examples, various samples of contact lenses subjected to embodiments of the coating process disclosed herein are examined. The examples highlight the wetting performance of these materials and the relative durability of this performance, as reflected in rub testing. It may be understood, however, that these examples are discussed for illustrative purposes and should not be construed to limit the embodiments of the invention.

Unless noted below, the surface modification process was performed using the following processing method:
with the disc or lens oriented concave up:
  about 7 minutes under vacuum;
  about 1 minute oxygen plasma activation at a power of about 400 Watts and temperature of about 35° C.;
  about 7 minutes methanol vapor deposition at a flow rate of about 15 cc/min and pressure of about 175 mtorr;
  about 7 seconds oxygen plasma oxidation;
with the disc or lens oriented concave down:
  about 7.5 minutes additional methanol vapor deposition;
  about 7 seconds oxygen plasma oxidation activation at a power of about 200 Watts and temperature of about 35° C.

Example 1

Effect of Processing Parameters on Contact Angle

To establish the effects of selected processing parameters on the wetability of contact lenses subjected to embodiments of the surface modification processes discussed herein, a series of samples were prepared under varying processing conditions. The selected processing parameters included: plasma activation time, oxygen versus nitrogen plasma oxidation, flow rate and pressure of organic compound (methanol), deposition time, oxidation time, and pulse versus continuous oxidation.

Discs of hard and soft contact lens materials were employed in this study. The hard disc materials comprised RGP material, while the soft disc materials comprised silicone hydrogel. The discs were coated in a horizontal, two-step coating process. Contact angle measurements were performed according to ANSI AZ80.20-2004 using the sisal method with a Goniometer manufactured by KSV and equipped with Cam 100 Optical Contact Angle Meter. The measured contact angles are summarized in Tables 1-6 below. All contact angles are in units of degrees unless otherwise stated.

TABLE 1

Contact Angle as a Function of Plasma Activation Time

| Condition | Contact Angle - Hard Disc Before Treatment (°) | Contact Angle - Hard Disc After Treatment (°) | Contact Angle - Soft Disc Before Treatment (°) | Contact Angle - Soft Disc After Treatment (°) |
|---|---|---|---|---|
| 1 min Oxygen Plasma Activation | >90 | 35.73 ± 9.96 | >90 | 53.02 ± 12.20 |
| 2 min Oxygen Plasma Activation | >95 | 49.53 ± 9.24 | >90 | 58.69 ± 9.58 |

Plasma activation times were varied over the range of about 1 minute to about 2 minutes. It is observed that, over this range, the contact angle decreases by approximately 40-50% or more for both hard and soft lenses, as compared to as-received lenses prior to treatment. Furthermore, within the standard deviation, the contact angle appears to be approximately unchanged with activation times between about 1 minute to about 2 minutes. Additionally, the contact angle of the soft and hard discs, for a given activation time, appears to be approximately unchanged.

TABLE 2

Contact Angle as a Function of Plasma Type During Surface Activation

| Condition | Contact Angle - Hard Disc Before Treatment (°) | Contact Angle - Hard Disc After Treatment (°) | Contact Angle - Soft Disc Before Treatment (°) | Contact Angle - Soft Disc After Treatment (°) |
|---|---|---|---|---|
| Oxygen Plasma | >90 | 40.80 ± 6.32 | >90 | 56.50 ± 7.11 |
| Nitrogen Plasma | >90 | 45.53 ± 4.37 | >90 | 61.51 ± 4.18 |

Nitrogen and oxygen plasmas were each employed for activation to investigate their effect on contact angle. It is observed that, irrespective of the plasma, the contact angle decreases by approximately 40-50%, as compared to as-received discs prior to treatment. Furthermore, within the standard deviation, the contact angle appears to be approximately unchanged with either oxygen or nitrogen plasma. It may be also noted that, within a given plasma, soft discs appear to give modestly higher contact angles, as compared to hard discs.

TABLE 3

Contact Angle as a Function of Deposition Flow Rate and Pressure

| Condition | Contact Angle - Hard Disc Before Treatment (°) | Contact Angle - Hard Disc After Treatment (°) | Contact Angle - Soft Disc Before Treatment (°) | Contact Angle - Soft Disc After Treatment (°) |
|---|---|---|---|---|
| 50 cc/min 250 mtorr | >90 | 46.26 ± 7.97 | >90 | 59.08 ± 7.48 |
| 100 cc/min 350 mtorr | >90 | 45.09 ± 8.89 | >90 | 58.02 ± 9.11 |
| 150 cc/min 500 mtorr | >90 | 47.50 ± 6.73 | >90 | 63.56 ± 5.43 |

Flow rates and pressures for methanol deposition were varied over the range of about 50 cc/min to about 150 cc/min and about 250 mtorr to about 500 mtorr, respectively. It is observed that, over these ranges, the contact angle decreases by approximately 40-50%, as compared to as-received discs prior to treatment. Furthermore, within the standard deviation, the contact angle appears to be approximately unchanged over the range of about 50 cc/min to about 150 cc/min flow rates and about 250 mtorr to about 500 mtorr pressures. The soft and hard discs also appear to exhibit approximately comparable contact angles for a given deposition condition.

TABLE 4

Contact Angle as a Function of Deposition Time

| Condition | Contact Angle - Hard Disc Before Treatment (°) | Contact Angle - Hard Disc After Treatment (°) | Contact Angle - Soft Disc Before Treatment (°) | Contact Angle - Soft Disc After Treatment (°) |
|---|---|---|---|---|
| 5 min | >90 | 49.00 ± 2.25 | >90 | 50.63 ± 1.54 |
| 7.5 min | >90 | 40.15 ± 5.86 | >90 | 45.70 ± 5.81 |
| 10 min | >90 | 45.88 ± 6.34 | >90 | 57.30 ± 3.37 |

Methanol deposition times were varied over the range of about 5 minutes to about 10 minutes. It is observed that, over this range, the contact angle decreases by approximately 40-50% or more, as compared to as-received discs prior to treatment. Furthermore, within the standard deviation, the contact angle appears to be approximately unchanged over the range of about 5-10 minutes of deposition. Soft discs exhibit a modestly higher contact angle than hard discs for a given deposition time.

TABLE 5

Contact Angle as a Function of Plasma Oxidation Time

| Condition | Contact Angle - Hard Disc Before Treatment (°) | Contact Angle - Hard Disc After Treatment (°) | Contact Angle - Soft Disc Before Treatment (°) | Contact Angle - Soft Disc After Treatment (°) |
|---|---|---|---|---|
| 7 sec | >90 | 45.88 ± 6.34 | >90 | 57.30 ± 3.37 |
| 14 sec | >90 | 44.48 ± 3.61 | >90 | 57.55 ± 3.68 |
| 28 sec | >90 | 40.31 ± 6.39 | >90 | 49.39 ± 12.35 |

Plasma oxidation times were varied over the range of about 7 seconds to about 28 seconds. It is observed that, over this range, for both hard and soft discs, the contact angle decreases by approximately 50% or more, as compared to as-received lenses prior to treatment. Furthermore, over the range of about 7 seconds to about 28 seconds of plasma oxidation, the contact angle of surface modified discs, within a given disc, is approximately the same, within the standard deviation. Soft discs exhibit a slightly higher contact angle than hard discs.

TABLE 6

Contact Angle as a Function of Pulsed Versus Continuous Plasma Oxidation

| Condition | Contact Angle - Hard Disc, Before Treatment (°) | Contact Angle - Hard Disc, After Treatment (°) | Contact Angle - Soft Disc, Before Treatment (°) | Contact Angle - Soft Disc, After Treatment (°) |
|---|---|---|---|---|
| 7 sec continuous | >90 | 36.09 ± 4.62 | >90 | 55.41 ± 14.06 |
| 20 sec pulse | >90 | 42.15 ± 8.49 | >90 | 57.08 ± 16.72 |

Contact angles of surface modified soft and hard discs subjected to plasma oxidation times of approximately 7 seconds of continuous oxidation and about 20 seconds pulsed oxidation with a duty cycle of about one half were examined. It is observed that, for both hard and soft discs, the contact angle decreased by approximately 40-50% or more, as compared to as-received discs prior to treatment, irrespective of the oxidation processes. Furthermore, within the standard deviation, the contact angle appears to be approximately unchanged between the approximately 7 seconds continuous oxidation and the approximately 20 seconds of pulsed oxidation. Soft and hard discs exhibited approximately the same contact angles for a give oxidation condition.

Example 2

Effect of Single- and Two-Step Deposition Processes on Contact Angle

To investigate the effects of contact lens orientation on the resultant contact angle during surface modification, soft discs, hard discs, and hybrid lenses were examined in single-step and two-step coating processes, and contact angle of the discs was measured in dry and hydrated conditions. The single-step coating processes included horizontal concave up, horizontal concave down, and vertical, while the two-step processes included coating horizontally both concave up and concave down. The results of these coating operations are illustrated below in Tables 7-8.

TABLE 7

Contact Angle as a Function of Horizontal Coating Process

| | | Concave Up | | Concave Down | | Double Coated | |
|---|---|---|---|---|---|---|---|
| Condition | Before Treatment (°) | After Plasma, Dry (°) | After Plasma, Hydrated, (°) | After Plasma, Dry (°) | After Plasma, Hydrated (°) | After Plasma, Dry (°) | After Plasma, Hydrated (°) |
| Hard Disc | 102.79 ± 6.16 | 22.15 ± 2.62 | 34.93 ± 3.61 | 30.88 ± 3.27 | 33.79 ± 2.98 | 19.29 ± 3.57 | 35.31 ± 5.89 |
| Soft Disc | 102.70 ± 3.46 | 48.83 ± 3.86 | 59.57 ± 9.38 | 48.07 ± 5.02 | 56.79 ± 6.08 | 23.62 ± 3.30 | 35.89 ± 5.79 |
| Hybrid Lens | 86.47 ± 3.51 | 38.02 ± 4.01 | 39.64 ± 2.49 | 37.68 ± 2.18 | 39.69 ± 5.51 | 32.16 ± 10.03 | 40.89 ± 3.37 |

TABLE 8

Contact Angle as a Function of Vertical Coating Process

| Condition | Before Treatment (°) | After Plasma, Dry (°) | After Plasma, Hydrated (°) |
|---|---|---|---|
| Hard Disc | 102.79 ± 6.16 | 46.49° ± 2.95 | 46.85° ± 3.30 |
| Soft Disc | 102.70 ± 3.46 | 60.38 ± 3.07 | 68.64 ± 5.47 |
| Hybrid Lens | 86.47 ± 3.51 | 49.41 ± 2.87 | 50.75 ± 4.66 |

As illustrated in Table 7, the contact angles of the hard discs and hybrid lenses in the dry condition were relatively insensitive to the horizontal coating process, about 19° to about 30° and about 32° to about 38°, respectively. When hydrated, the contact angles of the hard discs and hybrid lenses were approximately unchanged with the horizontal coating process, however the contact angles were higher than in the dry state, about 35° and about 40°, respectively.

In contrast, soft discs exhibited a significant improvement when undergoing the double-step horizontal coating process, as opposed to the single-step horizontal coating processes. In the double-step process, the aggregate contact angle was measured to be about 24°, as opposed to about 49°. These trends were also found in the hydrated state, though the contact angles were uniformly higher in the hydrated state, with the concave up and concave down angles measured to be about 57° to about 59° and the double coated contact angle measured to be about 36°

Examining the vertical coating results of Table 8, several features may be observed. The coated discs and lenses for each condition exhibit significantly reduced contact angles, as compared to the as-received disc or lens, illustrating that, irrespective of orientation, the treatment process is effective at improving the hydrophilicity of the lens surface.

In terms of improving the surface modification process, though, the vertically coated lenses and discs exhibit higher contact angles than those coated in the horizontal orientations. For example, hard discs coated vertically in dry condition exhibit contact angles which are roughly 50-100% higher, about 47°, compared to about 19° to about 30°. Similar observations may also be made for soft and hybrid lenses. Therefore, while the coating process in general provides improvements to the wetability of the contact lens surfaces, horizontal coating processes may be preferred for providing the largest degree of improvement.

Example 3

Effect of Wear on Wetability of Contact Lenses Coated in Single- and Two-Step Processes Soft discs, hard discs, and hybrid contact lenses were each subjected to the methanol coating process discussed above in Example 1 in both the single- and two-step horizontal coating processes to examine the effects of wear on wetability. To simulate the coating consistency and coherence during wet wear, the discs and lenses were subjected to a total of about 180 rubbing cycles. The hard discs, soft discs, or hybrid lens were placed in palm of hand and drop of saline or lens cleaning solution, such as the formulations available commercially under the trade names Opti Free Express or Acquify, was poured on the subject and unidirectional rubbing was applied for 10 times, then the subject was flipped and same process was repeated on the other side. This procedure was adapted based on regular cleaning of contact lenses after dispensing and storing in lens cleaning solution which has been recommended by solutions and lens manufacturer, which is the equivalent of approximately six months of lens wear. This six month period was selected as a target, as it is a generally recommended replacement time for contact lenses. 10 hard discs, 10 soft discs, and 10 hybrid lenses were used for each test.

Contact angle was measured in each of the ten samples for the lenses and discs after intervals of 30 rubbing cycles. The average contact angle values and standard deviation are summarized below in Tables 9 and 10.

TABLE 9

Summary of Contact Angle As a Function of Wear for Single Step Methanol Coated Discs and Lenses

| Single Step Coating | 0 Cycles (°) | 30 Cycles (°) | 60 Cycles (°) | 90 Cycles (°) | 120 Cycles (°) | 150 Cycles (°) | 180 Cycles (°) |
|---|---|---|---|---|---|---|---|
| Hard Disc | 26.80 ± 2.95 | 47.82 ± 2.20 | 36.11 ± 3.23 | 33.78 ± 2.78 | 34.29 ± 3.16 | 32.39 ± 3.31 | 32.79 ± 3.55 |
| Soft Disc | 36.58 ± 4.06 | 53.43 ± 4.17 | 40.32 ± 5.46 | 45.33 ± 5.32 | 46.26 ± 5.12 | 44.15 ± 4.85 | 46.66 ± 4.05 |
| Hybrid Lens | 31.90 ± 2.84 | 62.27 ± 2.30 | 40.33 ± 4.95 | 46.25 ± 3.55 | 55.55 ± 4.54 | 52.26 ± 7.78 | 54.16 ± 6.45 |

TABLE 10

Summary of Contact Angle As a Function of Wear for Double Step Methanol Treated Discs and Lenses

| Double Step Coating | 0 Cycles (°) | 30 Cycles (°) | 60 Cycles (°) | 90 Cycles (°) | 120 Cycles (°) | 150 Cycles (°) | 180 Cycles (°) |
|---|---|---|---|---|---|---|---|
| Hard Disc | 28.58 ± 2.56 | 49.62 ± 2.37 | 38.70 ± 3.05 | 35.08 ± 3.99 | 33.30 ± 4.57 | 32.56 ± 2.31 | 36.24 ± 3.32 |
| Soft Disc | 39.86 ± 4.50 | 48.09 ± 4.10 | 41.42 ± 3.80 | 42.97 ± 5.53 | 43.46 ± 5.29 | 42.15 ± 4.44 | 42.98 ± 3.73 |
| Hybrid Lens | 29.68 ± 2.26 | 62.68 ± 1.97 | 42.29 ± 4.53 | 46.32 ± 6.69 | 52.31 ± 3.28 | 55.58 ± 7.63 | 54.10 ± 4.66 |

As illustrated in Tables 9 and 10, the contact angles measured for the hard discs, soft discs and hybrid lenses subjected to single step coating, prior to rubbing, were about 26.80°, about 36.58°, and about 31.90°, while the hard discs, soft discs and hybrid lenses subjected to double step coating, prior to rubbing, were about 28.58°, about 39.86°, and about 29.68°. The contact angles for each of the lenses and discs rose when subjected to the 180 cycle rub treatment. For example, the contact angles of the hard disc, soft disc, and hybrid lens materials which underwent single step coating rose to about 32.79°, about 46.66°, and about 54.16°, respectively. The contact angles of the hard disc, soft disc, and hybrid lens materials which underwent double step coating rose to about 36.24°, about 42.98°, and about 54.10°, respectively.

These results illustrate two conclusions. First, the behavior of the discs and lenses undergoing single and double step coating exhibit substantially similar behavior with respect to their contact angles. This result illustrates that the processing of the lenses and discs is substantially insensitive to whether a single vertical or double horizontal coating operation is performed.

Second, the values of contact angles measured in the as-processed and 180 rub cycle condition are substantially similar, when taking their standard deviations into account. Thus, there is little to no change in the contact angle of discs and lenses coated after about 180 rubbing cycles (e.g., simulated wear of about 6 months). This result indicates that the significant improvement to wetability achieved through the coating process is robust and, therefore, long lasting.

Example 4

Effect of Flow Rate and Pressure on Wear Behavior of Contact Lenses

In order to evaluate possible effects of the delivery of the organic compound on wear behavior, lenses and discs were processed under varying deposition conditions in a two-step deposition process and subjected to about 180 rubbing cycles. Three different pressure and flow rate conditions were examined with methanol, with pressure ranging from about 190 mtorr to about 250 mtorr and flow rate ranging from about 20 cc/min to about 50 cc/min, as illustrated below in Table 11.

TABLE 11

Summary of Deposition Conditions

| Condition | Pressure (mTorr) | Flow Rate (cc/min) | Time (min) |
|---|---|---|---|
| 1 | 250 | 20 | 7.5 |
| 2 | 190 | 20 | 7.5 |
| 3 | 250 | 50 | 7.5 |

Five each of soft discs, hard discs, and hybrid lenses were prepared and evaluated for each of the conditions and the results are summarized in Tables 12-14.

TABLE 12

Contact Angle as a Function of Rubbing Cycles and Condition for Soft Discs

| Soft Disc | Condition 1 (°) | Condition 2 (°) | Condition 3 (°) |
|---|---|---|---|
| 0 Cycles | 29.60 ± 4.78 | 26.50 ± 4.57 | 61.68 ± 8.22 |
| 20 cycles | 35.35 ± 7.31 | 31.77 ± 6.95 | 61.92 ± 5.43 |
| 40 cycles | 34.42 ± 11.87 | 32.70 ± 4.47 | 55.09 ± 6.74 |
| 60 cycles | 44.17 ± 8.54 | 43.22 ± 4.58 | 57.10 ± 4.96 |
| 80 cycles | 48.15 ± 9.38 | 42.36 ± 4.44 | 59.89 ± 4.46 |
| 100 cycles | 49.97 ± 8.52 | 43.02 ± 6.25 | 58.64 ± 4.00 |
| 120 cycles | 50.31 ± 7.66 | 44.49 ± 4.34 | 59.24 ± 2.82 |
| 140 cycles | 53.06 ± 7.34 | 44.16 ± 5.82 | 57.34 ± 6.50 |
| 160 cycles | 52.65 ± 5.54 | 44.41 ± 6.14 | 58.71 ± 7.30 |
| 180 cycles | 54.25 ± 5.82 | 46.25 ± 5.04 | 59.83 ± 3.37 |

TABLE 13

Contact Angle as a Function of Rubbing Cycles and Condition for Hard Discs

| Hard Disc | Condition 1 (°) | Condition 2 (°) | Condition 3 (°) |
|---|---|---|---|
| 0 Cycles | 25.56 ± 5.70 | 24.97 ± 2.68 | 44.53 ± 8.30 |
| 20 cycles | 33.65 ± 5.18 | 27.97 ± 4.72 | 42.59 ± 5.27 |
| 40 cycles | 34.45 ± 5.32 | 34.37 ± 3.74 | 39.40 ± 3.55 |
| 60 cycles | 39.57 ± 5.65 | 41.95 ± 2.96 | 44.19 ± 4.46 |
| 80 cycles | 40.96 ± 3.64 | 43.72 ± 2.41 | 44.81 ± 4.16 |
| 100 cycles | 40.70 ± 3.84 | 44.21 ± 2.06 | 47.47 ± 5.07 |
| 120 cycles | 46.09 ± 3.69 | 46.51 ± 3.11 | 47.98 ± 4.48 |
| 140 cycles | 46.51 ± 6.09 | 46.31 ± 3.98 | 51.58 ± 2.44 |
| 160 cycles | 50.14 ± 5.45 | 47.78 ± 4.70 | 51.99 ± 2.45 |
| 180 cycles | 50.88 ± 4.26 | 46.24 ± 5.61 | 52.30 ± 3.91 |

TABLE 14

Contact Angle as a Function of Rubbing Cycles and Condition for Hybrid Lenses

| Hybrid Lens | Condition 1 (°) | Condition 2 (°) | Condition 3 (°) |
|---|---|---|---|
| 0 Cycles | 60.61 ± 2.67 | 59.91 ± 3.76 | 81.95 ± 2.48 |
| 20 cycles | 54.04 ± 3.26 | 61.09 ± 2.84 | 63.73 ± 2.16 |
| 40 cycles | 55.47 ± 2.90 | 56.40 ± 6.56 | 78.33 ± 10.01 |
| 60 cycles | 62.99 ± 4.74 | 65.01 ± 4.98 | 66.46 ± 5.73 |
| 80 cycles | 65.03 ± 1.90 | 74.26 ± 3.07 | 69.22 ± 2.69 |
| 100 cycles | 72.20 ± 3.16 | 62.12 ± 6.52 | 73.77 ± 5.31 |
| 120 cycles | 84.22 ± 3.37 | 82.75 ± 1.42 | 75.18 ± 0.65 |
| 140 cycles | 74.72 ± 6.06 | 73.14 ± 2.64 | 76.20 ± 1.94 |
| 160 cycles | 81.78 ± 2.98 | 84.48 ± 5.38 | 85.10 ± 7.29 |
| 180 cycles | 84.80 ± 2.08 | 85.10 ± 4.33 | 83.20 ± 5.51 |

From Tables 12-14, it may be observed that condition 2, a flow rate of about 20 cc/min and a pressure of about 190 mtorr, was the most effective condition, of those evaluated, at reducing contact angles over all cycles and all disc or lens materials. For example, contact angles of about 26.50°, about 24.97°, and about 59.91° were observed in the initial condition, without rubbing, in the soft disc, hard disc, and hybrid lens, respectively. These values rose to about 46.25°, about 46.24°, and about 85.10°, respectively, after about 180 rub cycles. These results indicate that contact angles are sensitive to flow rates and pressure, when considering long term durability. The results further indicate that improvements in contact angle may be achieved with deposition flow rates as low as about 20 cc/min and pressures of about 190 mtorr.

Example 5

Effect of Deposition Material on Contact Angle

The effect of different deposition materials was also investigated to examine their effect on the contact angles achieved through the surface modification process. The contact angle of these materials was measured in dry conditions immediately after plasma coating. Functionalized organic compounds tested included alcohol and aldehydes. Alcohols tested include 3-buten-1-ol, allyl alcohol, and ethanol. Aldehydes tested include butrylaldehyde. Silicon containing organic compounds tested included vinylpentamethyldi-siloxane, vinyl methyldiacetoxy-silane, 3-methacryloxy propyltristrimethylsiloxy-silane, and vinyltrimethyl-silane. Titanium containing organic compounds tested included titanium isopropoxide. The results of contact angle testing are illustrated below in Table 15.

Soft and hard discs modified with alcohols exhibited contact angles ranging between about 21° to about 51°. Organosilicon compounds exhibited contact angles of about 28° to 66°, while titanium isopropoxide exhibited contact angles of about 41° to about 52°. In each of these cases, the surface modification process significantly improves the contact angle of the discs. Furthermore, these benefits have been demonstrated when using alcohols, aldehydes, organosilicon and organotitanium compounds.

Example 6

Effect of Organic Material on Contact Angle of Contact Under Simulated Wear

In order to evaluate possible effects of the organic compound on wear behavior, hard and soft discs were processed using different organic compounds and subjected to about 180 rubbing cycles. The results are summarized below in Table 16.

TABLE 15

Contact Angle as a Function of Deposition Material

| Deposition Material | Contact Angle - Hard Disc Before Treatment (°) | Contact Angle - Hard Disc After Treatment (°) | Contact Angle - Soft Disc Before Treatment (°) | Contact Angle - Soft Disc Before Treatment (°) |
|---|---|---|---|---|
| 3-buten-1-ol | >90 | 21.11 ± 5.29 | >90 | 45.65 ± 7.29 |
| Allyl Alcohol | >90 | 35.96 ± 4.08 | >90 | 46.21 ± 6.24 |
| Ethanol | >90 | 35.69 ± 4.74 | >90 | 51.34 ± 5.31 |
| Methane | >90 | 33.11 ± 3.38 | >90 | 46.35 ± 6.92 |
| Butrylaldehyde | >90 | 25.90 ± 1.59 | >90 | 52.92 ± 5.74 |
| Bromohexane | >90 | 39.47 ± 2.78 | >90 | 64.33 ± 6.35 |
| Vinylpentamethyldi-siloxane | >90 | 31.50 ± 1.83 | >90 | 51.09 ± 4.90 |
| Vinylmethyldiacetoxy-silane | >90 | 27.18 ± 2.46 | >90 | 47.83 ± 8.09 |
| 3-methacryloxy propyltristrimethylsiloxy-silane | >90 | 39.68 ± 4.86 | | 65.64 ± 5.66 |
| Vinyltrimethyl-silane | >90 | 40.26 ± 7.23 | >90 | 42.49 ± 12.08 |
| Titanium Isopropoxide | >90 | 40.64 ± 3.54 | >90 | 51.40 ± 6.43 |

TABLE 16

Contact Angle as a Function of Deposition Material and Wear

| | Methanol (°) | | Ethanol (°) | | Isopropanol (°) | |
|---|---|---|---|---|---|---|
| Condition | Soft Disc | Hard Disc | Soft Disc | Hard Disc | Soft Disc | Hard Disc |
| 0 Cycles | 41.34 ± 6.94 | 37.73 ± 6.87 | 51.36 ± 7.96 | 41.63 ± 3.72 | 48.75 ± 4.81 | 35.81 ± 3.12 |
| 30 Cycles | 45.62 ± 4.38 | 41.89 ± 4.30 | 44.70 ± 8.32 | 37.82 ± 3.20 | 44.18 ± 3.07 | 35.27 ± 2.39 |
| 60 Cycles | 42.83 ± 4.69 | 45.94 ± 5.38 | 49.11 ± 6.22 | 42.91 ± 2.57 | 42.02 ± 5.64 | 42.85 ± 3.69 |
| 90 Cycles | 49.69 ± 3.58 | 47.78 ± 3.26 | 52.20 ± 4.92 | 50.67 ± 6.49 | 42.02 ± 5.64 | 42.85 ± 3.69 |
| 120 Cycles | 53.11 ± 4.16 | 48.03 ± 4.38 | 53.33 ± 4.89 | 49.24 ± 1.58 | 47.45 ± 5.76 | 43.49 ± 9.13 |
| 150 Cycles | 52.28 ± 5.00 | 52.93 ± 5.55 | 51.60 ± 2.63 | 47.90 ± 13.80 | 49.92 ± 6.00 | 42.63 ± 14.77 |
| 180 Cycles | 51.53 ± 3.02 | 50.78 ± 2.57 | 52.24 ± 2.53 | 50.59 ± 1.62 | 50.54 ± 2.15 | 49.50 ± 50.07 |

TABLE 16-continued

Contact Angle as a Function of Deposition Material and Wear

| | THF (°) | | Allyl alcohol (°) | | T-1 | |
|---|---|---|---|---|---|---|
| Condition | Soft Disc | Hard Disc | Soft Disc | Hard Disc | Soft Disc | Hard Disc |
| 0 Cycles | 48.08 ± 6.00 | 34.76 ± 3.48 | 47.55 ± 7.17 | 37.45 ± 3.26 | 45.07 ± 3.03 | 39.73 ± 3.55 |
| 30 Cycles | 46.02 ± 5.06 | 35.87 ± 4.48 | 49.42 ± 4.98 | 38.50 ± 5.57 | 47.00 ± 6.48 | 46.71 ± 3.07 |
| 60 Cycles | 51.99 ± 1.96 | 42.24 ± 2.15 | 55.17 ± 5.92 | 44.91 ± 3.20 | 53.80 ± 4.37 | 46.53 ± 1.86 |
| 90 Cycles | 51.22 ± 10.84 | 44.71 ± 8.41 | 48.03 ± 3.79 | 45.30 ± 2.30 | 53.72 ± 5.38 | 50.24 ± 3.54 |
| 120 Cycles | 49.67 ± 10.26 | 49.90 ± 2.56 | 53.86 ± 11.40 | 47.71 ± 11.38 | 45.39 ± 4.93 | 45.83 ± 8.86 |
| 150 Cycles | 50.26 ± 13.69 | 49.29 ± 10.50 | 53.76 ± 9.47 | 52.90 ± 15.13 | 49.67 ± 4.89 | 46.42 ± 5.91 |
| 180 Cycles | 55.88 ± 15.59 | 50.07 ± 10.167 | 55.13 ± 10.13 | 52.67 ± 10.13 | 47.04 ± 1.77 | 46.44 ± 4.72 |

As discussed above in Example 5, each of the organic compounds employed in embodiments of the surface modification process provide improvements in the measured contact angle of the hard and soft discs evaluated. In general, the contact angles exhibit values that range between about 35° to about 48° in the initial condition and rise modestly to about 47° to 53° after about 180 rubbing cycles, irrespective of the type of lens or organic material. The finding that the contact angles measured for the initial and 180 rubbing cycle conditions are approximately the same, within the standard deviation of the measurements, indicates that wetability of the surface modified contact lenses is substantially unchanged after 180 rubbing cycles. These results illustrate that the durability of the surface modified lenses is relatively insensitive to the choice of organic compound and lens type and that the benefits of the surface modification process may be achieved using a variety of organic compounds, as described herein.

Although these inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or sub-combinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A method of increasing the hydrophilicity of a polymer surface, comprising:
    exposing a polymer substrate to a first plasma under conditions selected to generate free radicals on a surface of the polymer substrate;
    reacting an organic compound with the free radicals on the surface of the polymer substrate to thereby form an organic coating, wherein the organic compound is methanol; and
    exposing the organic coating to a second plasma under conditions selected to oxidize the organic coating to thereby form a hydrophilic layer at the substrate surface.

2. The method of claim 1, wherein the polymer substrate is a contact lens or portion thereof.

3. The method of claim 1, wherein the first plasma is selected from an oxygen plasma, nitrogen plasma, ozone plasma, and hydrogen peroxide plasma.

4. The method of claim 1, wherein the polymer substrate is exposed to the first plasma for an exposure time in the range of from about 10 seconds to about 2 minutes.

5. The method of claim 1, wherein reacting an organic compound with the free radicals on the surface of the polymer substrate comprises contacting the organic compound with the polymer substrate in the presence of an alternating electric field.

6. The method of claim 1, wherein the second plasma is an oxygen plasma, an ozone plasma, or a hydrogen peroxide plasma.

7. The method of claim 6, wherein the organic coating is exposed to the second plasma for an exposure time in the range of from about 7 seconds to about 28 seconds.

8. The method of claim 1, wherein the contact angle of water with respect to the hydrophilic layer is less than that of the surface of the polymer substrate prior to exposure to the first plasma.

9. The method of claim 8, wherein the contact angle of water with respect to the hydrophilic layer is reduced by at least half as compared to the polymer substrate prior to exposure to the first plasma.

10. The method of claim 1, further comprising cleaning the polymer substrate with a basic solution prior to exposure to the first plasma.

11. The method of claim 1, further comprising subjecting the polymer substrate to a vacuum under conditions selected to substantially remove water at the surface of the substrate prior to exposure to the first plasma.

12. The method of claim 1, wherein the method is performed with the polymer substrate mounted in a substantially horizontal orientation.

13. A method of reducing the hydrophobicity of a contact lens surface, comprising:
    providing a contact lens;
    exposing the contact lens to a first plasma under conditions selected to generate free radicals on a surface of the contact lens;
    contacting an organic compound with the free radicals on the surface of the contact lens under conditions selected to form a hydrophilic surface on the contact lens, the hydrophilic surface having a contact angle with respect to water that is less than about 50°.

14. The method of claim 13, wherein the organic compound is linear, branched or cyclic and wherein the organic compound is selected from the group consisting of a $C_1$-$C_{20}$ alcohol, a $C_1$-$C_{20}$ ether, a $C_1$-$C_{20}$ aldehyde, a $C_1$-$C_{20}$ ketone, a $C_1$-$C_{20}$ ester, a $C_1$-$C_{20}$ alkane, a $C_2$-$C_{20}$ alkenyl, a $C_6$-$C_{20}$ aryl, a $C_1$-$C_{20}$ organosilicon compound, $C_1$-$C_{20}$ organosilane compound, a $C_1$-$C_{20}$ organophosphorous compound, a $C_1$-$C_{20}$ organotitanium compound a $C_1$-$C_{20}$ organotin compound, a $C_1$-$C_{20}$ organogermanium compound, and a $C_1$-$C_{20}$ organoboron compound.

15. The method of claim 13, wherein the organic compound has the formula R—O—R', where R and R' are each independently selected from H, linear $C_1$-$C_{10}$ alkyl, branched $C_1$-$C_{10}$ alkyl, cyclic $C_3$-$C_{10}$ alkyl, linear $C_2$-$C_{10}$ alkenyl, branched $C_2$-$C_{10}$ alkenyl, and cyclic $C_3$-$C_{10}$ alkenyl, with the proviso that R and R' may not both be selected to be H; or R and R' may be joined together to form a $C_4$-$C_5$ cyclic ether.

16. The method of claim 13, wherein the organic compound is a ketone of the formula R—(C=O)—R' or an ester of the formula R—(C=O)—OR', where R and R' are independently selected from H, linear $C_1$-$C_{10}$ alkyl, branched $C_1$-$C_{10}$ alkyl, cyclic $C_3$-$C_{10}$ alkyl, linear $C_2$-$C_{10}$ alkenyl, branched $C_2$-$C_{10}$ alkenyl, and cyclic $C_3$-$C_{10}$ alkenyl; or R and R' may be joined together to form a cyclic $C_3$-$C_6$ ketone or $C_3$-$C_6$ lactone.

17. The method of claim 13, wherein the organic compound is selected from the group consisting of a $C_1$-$C_{20}$ organosilicon compound, a $C_1$-$C_{20}$ organosilane compound, a $C_1$-$C_{20}$ organophosphorous compound, a $C_1$-$C_{20}$ organotitanium compound, a $C_1$-$C_{20}$ organotin compound, a $C_1$-$C_{20}$ organogermanium compound, and a $C_1$-$C_{20}$ organoboron compound.

18. The method of claim 13, wherein the organic compound is methanol.

19. The method of claim 13, wherein the first plasma is an oxygen plasma, a nitrogen plasma, an ozone plasma, or a hydrogen peroxide plasma.

20. The method of claim 13, wherein the contact lens is exposed to the first plasma for an exposure time in the range of from about 10 seconds to about 2 minutes.

21. The method of claim 13, wherein the conditions selected to form a hydrophilic surface on the contact lens comprise reacting the organic compound with the free radicals on the surface of the contact lens to form an organic coating.

22. The method of claim 13, wherein contacting the organic compound with the free radicals on the surface of the contact lens comprises contacting the organic compound with the contact lens in the presence of an alternating electric field.

23. The method of claim 21, further comprising oxidizing the organic coating by exposure to a second plasma.

24. The method of claim 23, wherein the plasma is one of an oxygen plasma, an ozone plasma, and a hydrogen peroxide plasma.

25. The method of claim 23, wherein the contact lens is exposed to the second plasma for between about 7 sec to about 28 sec.

26. The method of claim 23, wherein the power applied to the second plasma is in the range of about 200 Watts to about 450 Watts.

27. The method of claim 13, wherein the method is performed with the contact lens mounted in a substantially horizontal orientation.

* * * * *